United States Patent
Waschke (10) Patent No.: US 9,501,564 B1
(45) Date of Patent: Nov. 22, 2016

(54) CONFIGURATION ITEM RECONCILIATION (71) Applicant: CA, Inc., Islandia, NY (US)

(72) Inventor: Marvin Garold Waschke, Bellingham, WA (US)

(73) Assignee: CA, Inc., New York, NY (US)

( * ) Notice: Subject to any disclaimer, the term of this patent is extended or adjusted under 35 U.S.C. 154(b) by 165 days.

(21) Appl. No.: 14/053,407

(22) Filed: Oct. 14, 2013

Related U.S. Application Data (63) Continuation of application No. 12/706,543, filed on Feb. 16, 2010, now Pat. No. 8,560,543.

(51) Int. Cl.
G06F 7/00 (2006.01)
G06F 17/30 (2006.01)

(52) U.S. Cl.
CPC ..... G06F 17/30705 (2013.01); G06F 17/3015 (2013.01); G06F 17/30289 (2013.01)

(58) Field of Classification Search
None
See application file for complete search history.

(56) References Cited

U.S. PATENT DOCUMENTS

| | | | |
|---|---|---|---|
| 8,560,543 B2* | 10/2013 | Waschke | 707/737 |
| 2001/0047279 A1* | 11/2001 | Gargone | 705/1 |
| 2007/0143398 A1* | 6/2007 | Graham | 709/204 |
| 2007/0198666 A1* | 8/2007 | Hoyes et al. | 709/220 |
| 2009/0030885 A1* | 1/2009 | DePasquale et al. | 707/3 |
| 2009/0060393 A1* | 3/2009 | Satoh | 382/305 |
| 2010/0161577 A1* | 6/2010 | Morozov | 707/705 |
| 2010/0169135 A1* | 7/2010 | Lepari et al. | 705/7 |
| 2013/0046739 A1* | 2/2013 | Waschke et al. | 707/691 |

* cited by examiner

*Primary Examiner* — Michael Hicks
(74) *Attorney, Agent, or Firm* — Gilliam IP PLLC (57) ABSTRACT

This document discusses, among other things, a method for reconciliation of a configuration item with a configuration management database. Properties of the configuration item are divided into a plurality of classes. Different classes correspond to properties having a different relationship with a corresponding configuration item. At least one property of the configuration item is compared to properties of configuration items in a configuration management database. Different actions are taken with respect to the configuration item based on the class of the property being compared.

20 Claims, 3 Drawing Sheets

CONFIGURATION ITEM RECONCILIATION

CROSS REFERENCE TO RELATED APPLICATION(S)

The present application is a continuation of U.S. application Ser. No. 12/706,543, filed Feb. 16, 2010, which is hereby incorporated herein by reference in its entirety.

BACKGROUND

Many organizations use configuration management databases (CMDBs) to organize information relating to information technology (IT) devices including logical and physical components related to management of IT services. CMDBs comprise a repository of information related to IT components and devices. The physical or logical IT components and devices are referred to as configuration items (CI). Thus, CMDBs comprise a catalog of configuration items and information related to the configuration items. For example, a CMDB may describe a configuration item based on its technical details, its ownership, or its relationship to other configuration items.

CMDB management often involves federation. Federation comprises adding information to a CMDB or combining multiple CMDBs. During federation, the information added to a CMDB must be reconciled with existing information to reduce duplicate configuration items and ensure all information relating to a particular configuration item is added accurately. Due to the massive amount of information in CMDBs, computing power is ideally used to aid in the determination as to whether a piece of information to be added relates to an established configuration item or new configuration item. This process of reconciliation, however, presents many difficulties. In fact, accurate reconciliation is frequently cited as an obstacle to implementing a federated CMDB.

Conventional reconciliation implementation are often cited as slow, erroneous, and requiring too much manual intervention. Conventional reconciliation implementations also usually rely on choosing properties of the configuration items to compare and using simple matches between the properties to decide. There are, however, several ways in which these simple matching algorithms can fail and produce false matches and false mismatches, resulting in reconciliation errors and forcing unnecessary manual reconciliation.

OVERVIEW

This document discusses, among other things, a method for reconciliation of a configuration item with a configuration management database. Properties of the configuration item are divided into a plurality of classes. Different classes correspond to properties having a different relationship with a corresponding configuration item. At least one property of the configuration item is compared to properties of configuration items in a configuration management database. Different actions are taken with respect to the configuration item based on the class of the property being compared.

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

The present inventor has recognized that, among other things, different properties for configuration items (CIs) can, when compared, provide different information. The different properties can be divided in different classes based on the information that the property can provide. These different classes can then be used during reconciliation for more accurate results.

Figure 1:
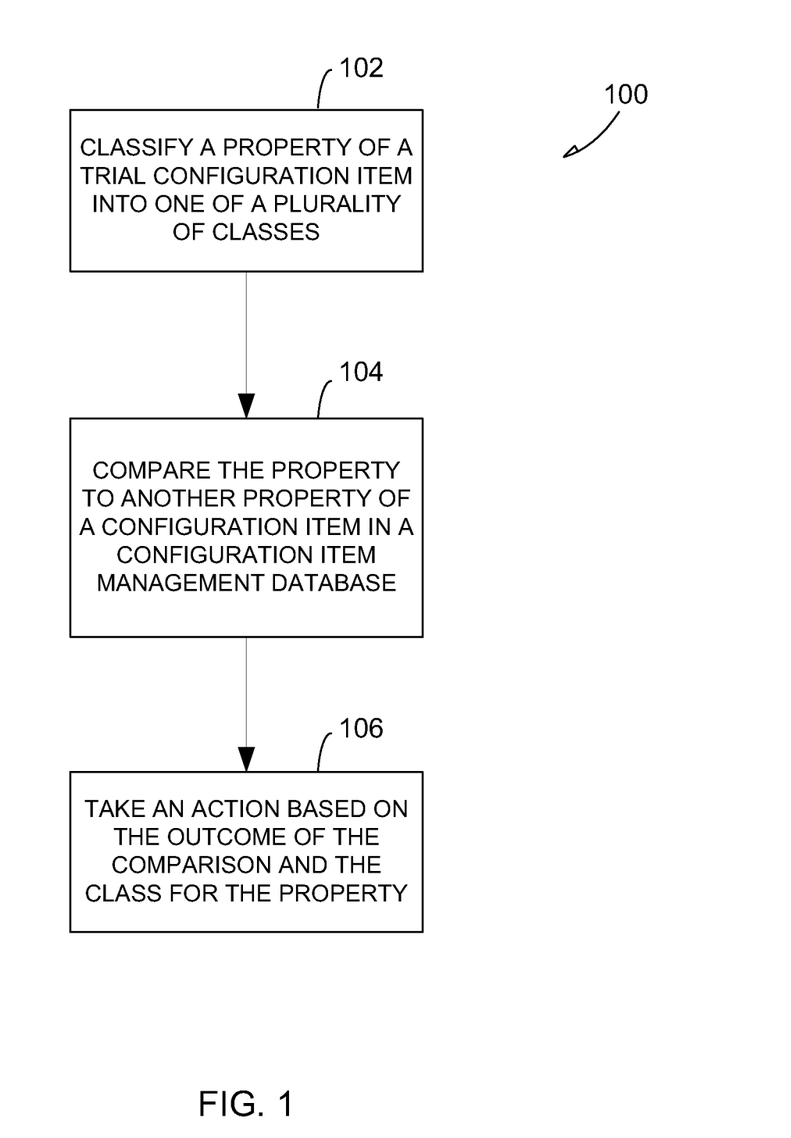
FIG. 1 illustrates an example of a method of comparing a first property of a trial configuration item with one or more properties of configuration items in a configuration management database.

FIG. 1 illustrates an example of a method 100 for comparison of a first property of a trial configuration item with one or more properties of configuration items in a configuration management database (CMDB). A trial configuration item corresponds to a configuration item that is being reconciled with the contents of an existing CMBD. The comparison can be used as a part of reconciliation of the trial configuration item with the CMDB. Reconciliation of a trial configuration item determines whether a matching configuration item exists within the CMDB or whether the trial configuration item is a new configuration item (no matching configuration item) within the CMDB. If reconciliation cannot determine whether the trial configuration item corresponds to an existing configuration item or is a new configuration item, an indeterminate exception is generated. The possible determinations made from reconciliation (e.g., matching CI, new CI, and indeterminate exception) are referred to herein as final conclusions to reconciliation.

A match between two configuration items means that the two configuration items should be combined into a single configuration item. In an example, matching configuration items correspond to the same physical or logical entity. Likewise, a non-match between two configuration items means that the two configuration items should not be combined. In an example, a non-matching configuration items correspond to different physical or logical entities. In an example, after an indeterminate exception is generated, the trial configuration item is manually reconciled.

At 102 of method 100, a first property of a trial configuration item is classified into one of a plurality of classes. In an example, a property is classified into one of the plurality of classes based on a relationship between the property and the configuration item. For example, a first class of properties can include properties that have a one-to-one relationship with a configuration item, while a second class of properties can include properties that have a one-to-many relationship with a configuration item.

In an example, the plurality of classes includes three classes: a unique identifier class, a general identifier class, and a differentiator class. As referred to herein a "unique identifier" corresponds to a property in the unique identifier class. Likewise, a "general identifier" corresponds to a property in the general identifier class. Finally, a "differentiator" corresponds to a property in the differentiator class.

In an example, a unique identifier comprises a property that has a one-to-one relationship with a configuration item. That is, each configuration item has only one of the particular type of unique identifier and each unique identifier corresponds to only one configuration item. A configuration item, however, can have multiple different types of unique identifiers. For example, a unique identifier can include (type #1) an asset tag (e.g., a physical tag placed on a device by asset managers), and (type #2) a make-model-serial number of a device. A configuration item can have either, or both of these types of unique identifiers, but cannot have more than one of a particular type.

In an example, a general identifier comprises a property that has a many-to-one relationship with a configuration item. That is, each configuration item can have multiple general identifiers of a single type, but each general identifier corresponds to only one configuration item. In an example, a general identifier can include a media access control (MAC) address for a device. A single device can have more than one MAC address, but each MAC address corresponds to only one device.

In an example, a differentiator comprises a property that has a one-to-many relationship with a configuration item. That is, each configuration item can have only one of the particular type of differentiator, but each differentiator can correspond to multiple configuration items. In an example, a differentiator can include a purchase date of a device. A single device can have only one purchase date, but a single purchase date can correspond to multiple different devices.

At 104, the first property of the trial configuration item is compared to a second property of a configuration item in the CMDB. The second property is of the same type as the first property.

In an example, a comparison between the first property and the second property has one of three possible outcomes: a match, a non-match, and a null. A match outcome indicates that the first property is the same as the second property. For example, when the first property is an asset tag comprising 456-AT-2893, the first property matches a second property with an asset tag comprising 456-AT-2893. A non-match indicates that the first property is different than the second. For example, when the first property is an asset tag comprising 456-AT-2893, the first property does not match a second property with an asset tag comprising 456-UR-5546. A null indicates that the first property is not comparable to the property to which the first property is being compared. A null can be encountered due to, for example, an empty field for the second property of a configuration item in the CMDB.

At 106, an action is taken based on the outcome of the comparison and the class of the properties being compared. In an example, the action can include a final conclusion that the configuration item corresponding to the first property is a match with the configuration item corresponding to second property. In another example, the action can include a final conclusion that the configuration item corresponding to the first property is a new configuration item. In yet another example, the action can include a final conclusion that an indeterminate exception should be generated. In still another example, the action can include performing another comparison for a property of the trial configuration item and a property of a configuration item in the CMDB.

In an example, when the outcome of a comparison between two unique identifiers are a match, a final conclusion that their corresponding configuration items match is made. A match between two unique identifiers indicates a match between their corresponding configuration items. For example, when a first make-model-serial number matches a second make-model-serial number the corresponding configuration items are referring to the same device. When the outcome of a comparison between two unique identifiers is a non-match, the first property can be compared to another unique identifier (e.g., the next in a list) in the CMDB. A non-match between two unique identifiers indicates a non-match between their corresponding configuration items. For example, when a first make-model-serial number does not match a second make-model-serial number the corresponding configuration items are referring to different devices. When the first property has been compared to all unique identifiers in the CMDB, and all outcomes are non-match, a final conclusion that the first configuration item is a new configuration item is made. When the outcome of a comparison between two unique identifiers is a null, the first property is compared to another unique identifier (e.g., the next in a list) to determine if any other unique identifiers match the first unique identifier. A null outcome provides no information regarding the configuration items corresponding to the first and second property. When a first unique identifier has been compared to all unique identifiers and no match outcomes have been determined, but one or more nulls have been encountered, comparisons with the first unique identifier are ended, and no information is provided regarding the trial configuration item.

In an example, when the outcome of a comparison between two general identifiers is a match, a final conclusion that their corresponding configuration items are a match is made. A match between two general identifiers indicates a match between their corresponding configuration items. For example, when a first MAC address matches a second MAC address, the corresponding configuration items are referring to the same device. When the outcome of a comparison between two general identifiers is a non-match or a null, the first property can be compared to another general identifier (e.g., the next in a list) in the CMDB. A non-match between two general identifiers provides no information regarding their corresponding configuration items. Since a single device can have more than one MAC address, two non-matching MAC address could correspond to the same device or two different devices. A null outcome also provides no information regarding the two configuration items. When a first general identifier has been compared to all general identifiers in the CMDB, and all outcomes have been either a null or a non-match, comparisons with the first general identifier are ended, and no information is provided regarding the trial configuration item.

In an example, when the outcome of a comparison between two differentiators is a match or a null, comparisons with the first property are ended, and no information is provided regarding the trial configuration item. A match or a null between two differentiators indicates that the trial configuration item a final conclusion that the trial configuration item is a new configuration item cannot be made based on the first property. For example, since a first purchase date that matches a second purchase date, cannot be used to differentiate the corresponding configuration items, the first purchase date cannot be used to determine that the configuration item corresponding to the first purchase date is different than all configuration items in the CMDB. Likewise, a null also cannot be used to differentiate the first property, therefore, the first property cannot be used to determine that the configuration item corresponding to the first property is different than all configuration items in the CMDB. When the outcome of a comparison between two differentiators is a non-match, the first property can be compared to another differentiator (e.g., the next in a list) in the CMDB. A non-match between differentiators indicates a non-match between their corresponding configuration items. For example, when a first purchase date does not match a second purchase date, the corresponding configuration items are referring to two different devices. When a first differentiator has been compared to all other differentiators in the CMDB, and all outcomes have been non-match, a final conclusion that the trial configuration item (corresponding to the first differentiator) is a new configuration item is made.

Figure 2:
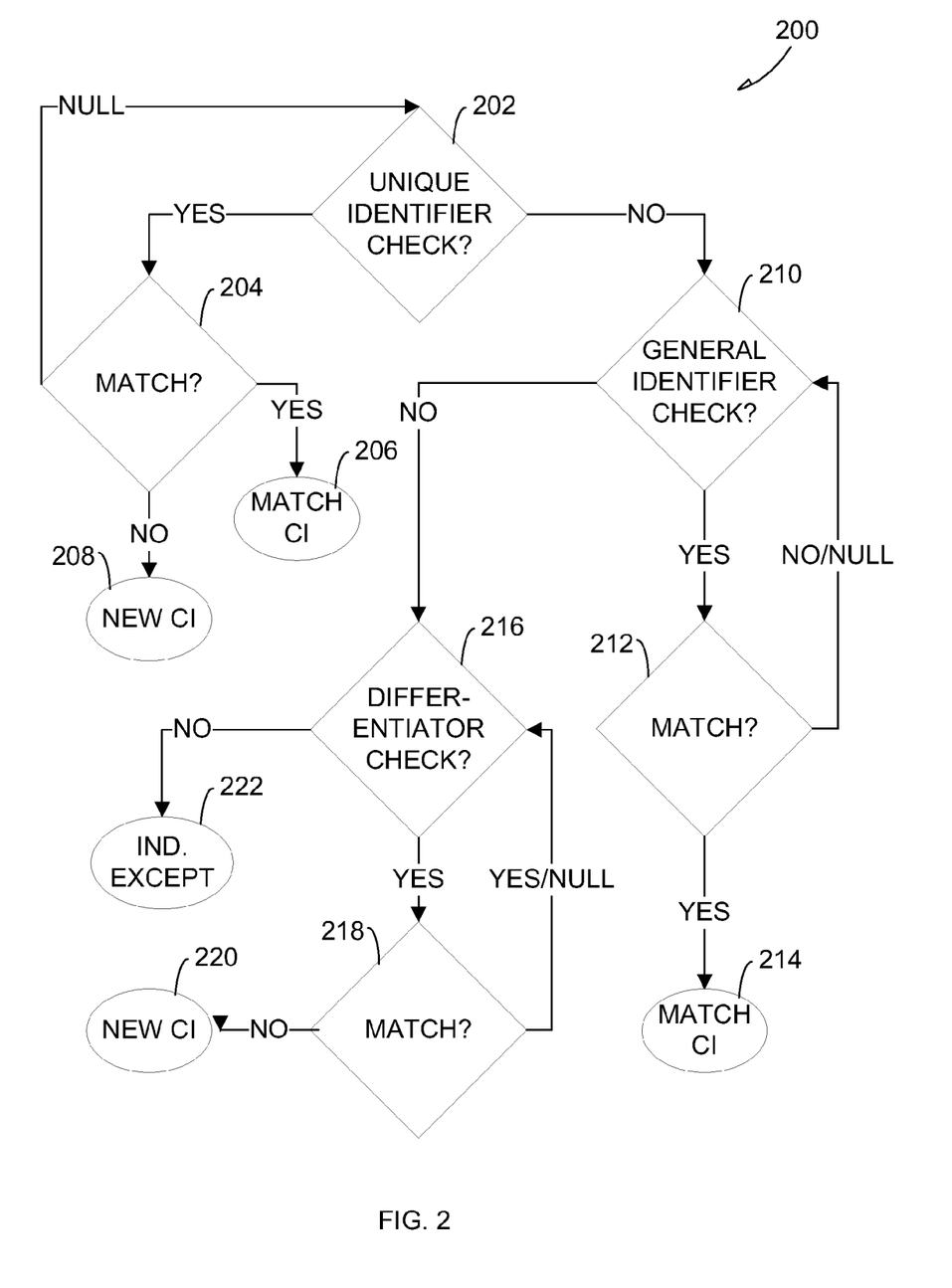
FIG. 2 illustrates an example of a method for reconciliation of a configuration item with a configuration management database.

FIG. 2 illustrates an example of a method 200 for reconciliation of a trial configuration item with a CMDB. Reconciliation of the trial configuration item can include multiple comparisons as described with respect to method 100 for a plurality of different properties of the trial configuration item. In an example, each of the properties for a trial configuration item are classified into one of the plurality of classes as described with respect to method 100. Once the properties are classified, one or more of the properties of the trial configuration item are compared to properties of configuration items in the CMDB until a final conclusion can be made. In an example, once a final conclusion can be made, reconciliation for the trial configuration item is ended and appropriate action is taken based on the final conclusion.

At 202, the trial configuration item is checked to determine whether the trial configuration item has any unique identifiers. If the trial configuration item does have at least one unique identifier, the method 200 proceeds to 204 where a first unique identifier is compared to unique identifiers of the same type (e.g., asset tag) for configuration items in the CMDB.

At 204, the first unique identifier is compared to each unique identifiers in the CMDB until either 1) a final conclusion that the trial configuration item is a new configuration item is made, 2) a final conclusion that the trial configuration item matches an existing configuration item is made, or 3) no information regarding the trial configuration item can be determined. A final conclusion that the trial configuration item is a new configuration item made when comparisons between the first unique identifier and all the unique identifiers of the same type in the CMDB result in an non-match outcome. In an example, once a final conclusion of a new configuration item is made at 204, a new configuration item is created for the trial configuration item (206). A final conclusion that the trial configuration item matches an existing configuration item is made when a comparison between the first unique identifier and a unique identifier in the CMDB results in a match outcome. In an example, once a final conclusion of a match is made, the trial configuration item is combined with the matching configuration item (208). No information can be determined regarding the trial configuration item when a null is encountered during a comparison with the first unique identifier and no comparisons resulted in a match outcome. In an example, when no information can be determined, the method proceeds back to 202 and checks for another unique identifier. If, at 202, a second unique identifier exists for the trial configuration item, the method again proceeds to 204 to compare the second unique identifier to the unique identifiers of the same type in the CMDB. The process of checking for unique identifiers (202) and comparing unique identifiers (204) is continued until either a final conclusion is made or all unique identifiers for the trial configuration item have been compared.

When no more unique identifiers exist for the trial configuration item, the method 200 proceeds to 210, where the trial configuration item is checked to determine whether the trial configuration item has any general identifiers. If the trial configuration item does have at least one general identifier, the method 200 proceeds to 212 where a first general identifier is compared to general identifiers of the same type (e.g., asset tag) for configuration items in the CMDB.

At 212, the first general identifier is compared to each general identifier in the CMDB until either 1) a final conclusion that the trial configuration item matches an existing configuration item is made, or 2) no information regarding the trial configuration items can be determined with the first general identifier. A final conclusion that the trial configuration item matches an existing configuration item is made when a comparison between the first general identifier and a general identifier in the CMDB results in a match outcome. In an example, once a final conclusion of a match is made, the trial configuration item is combined with the matching configuration item (214). No information can be determined regarding the trial configuration item when comparisons between the first general identifier and all the general identifiers of the same type in the CMDB resulting in either a null or a non-match outcome. In an example, when no information can be determined, the method proceeds back to 210 and checks for another general identifier. If, at 210, a second general identifier exists for the trial configuration item, the method again proceeds to 212 to compare the second general identifier to the general identifiers of the same type in the CMDB. The process of checking for general identifiers 210 and comparing general identifiers 212 is continued until either a final conclusion is made or all general identifiers for the trial configuration item have been compared.

When no more general identifiers exist for the trial configuration item, the method 200 proceeds to 216, where the trial configuration item is checked to determine whether the trial configuration item has any differentiators. If the trial configuration item has at least one differentiator, the method 200 proceeds to 218 where a first differentiator is compared to differentiators of the same type for configuration items in the CMDB.

At 218, the first differentiator is compared to each differentiator in the CMDB until either 1) a final conclusion that the trial configuration item is a new configuration item is made, or 2) no information regarding the trial configuration item can be determined with the first differentiator. A final conclusion that the trial configuration item is a new configuration item is made when comparisons between the differentiator and all the differentiators of the same type in the CMDB result in a non-match outcome. In an example, once a final conclusion of a new configuration item is made at 218, a new configuration item is created for the trial configuration item (220). No information can be determined regarding the trial configuration item when a comparison between the first differentiator and one of the differentiators of the same type in the CMDB results in either a null or a non-match outcome. In an example, when no information can be determined, the method proceeds back to 216 and checks for another differentiator. If, at 216, a second differentiator exists for the trial configuration item, the method again proceeds to 218 to compare the second differentiator to the differentiators of the same type in the CMDB. The process of checking for differentiators (218) and comparing differentiators (220) is continued until either a final determination is made or all differentiators have been compared.

When no more differentiators exist for the trial configuration item, the method 200 proceeds to 222 and an indeterminate exception is generated. And indeterminate exception is generated because no information can be determined regarding the trial configuration item with any of the properties of the trial configuration item.

Although as described above, the method 200 includes comparing any unique identifiers first, comparing any general identifiers after any unique identifiers, and comparing any differentiators after comparing any general identifiers, in other examples, other orders of comparison are used. For example, any general identifiers can be compared, any unique identifiers can be compared after any general identifiers, and any differentiators can be compared after any unique identifiers. Furthermore, although as described above, the method 200 comparing all the properties for a given class (e.g., unique identifiers) before proceeding to compare properties of the next class (e.g., general identifiers), in other examples, the comparisons of any properties of a given class may be interspersed between comparisons of properties of another class. For example, a first unique identifier can be compared, and after the first unique identifier is compared a first general identifier can be compared. After the first general identifier is compared, a second unique identifier can be compared.

In an example, the method 200 can include receiving a prioritization input to prioritize the comparison of the classes. In an example, the prioritization input can contain information regarding the order of comparison of the respective classes of properties. For example, the prioritization input can specify that any unique identifiers are to be compared first, followed by any general identifiers, and then any differentiators. In an example, the prioritization input can contain information regarding the order of comparison of a type of property (e.g., an asset tag) with respect to other property types. For example, the prioritization input can specify that any asset tags are compared prior to any make-model-serial numbers. In an example, the prioritization input can contain information regarding classes or types of properties to ignore (e.g., not compare to the CMDB). For example, the prioritization input can specify that a first type (e.g., purchase date) and a second type (e.g., disk model) of differentiator do not need to be compared, and that a third type (e.g., RAM size) should be compared prior to a fourth type (e.g., DVD drive model). In certain examples, the method 200 can prompt a user for a prioritization input. The prompt can occur prior to comparing any properties of the trial configuration item, or after comparing some properties but prior to comparing other properties.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, the code may be tangibly stored on one or more volatile or non-volatile computer-readable media during execution or at other times. These computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like.

Figure 3:
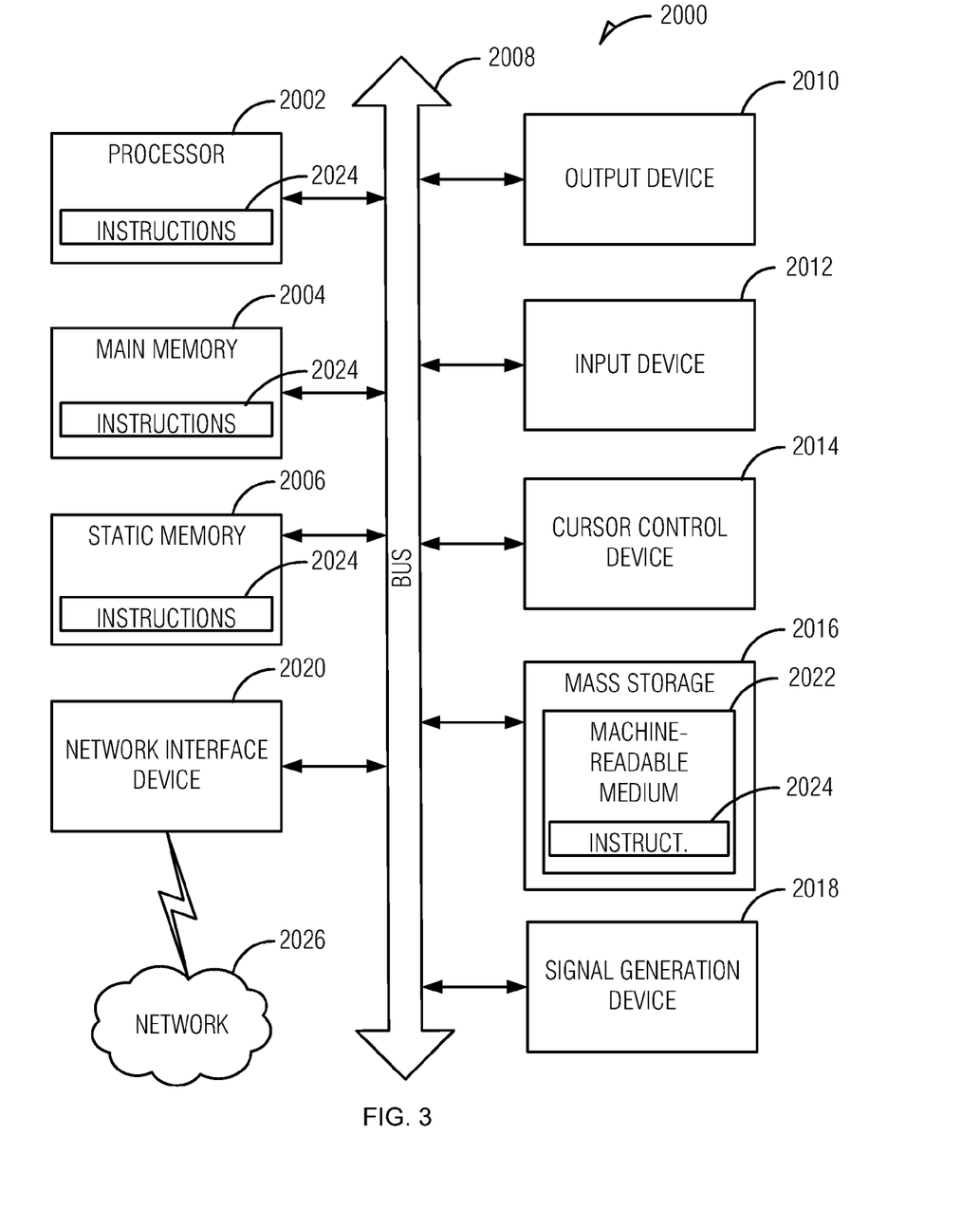
FIG. 3 illustrates an example of a machine for implementing the method of FIG. 1 or FIG. 2.

FIG. 3 is an example machine 2000. Upon reading and comprehending the content of this disclosure, one of ordinary skill in the art will understand the manner in which a software program can be launched from a computer-readable medium in a computer-based system to execute the functions defined in the software program. One of ordinary skill in the art will further understand the various programming languages that can be employed to create one or more software programs designed to implement and perform the methods disclosed herein. The programs can be structured in an object-orientated format using an object-oriented language such as Java or C++. Alternatively, the programs can be structured in a procedure-orientated format using a procedural language, such as assembly or C. The software components can communicate using any of a number of mechanisms well known to those of ordinary skill in the art, such as application program interfaces or interprocess communication techniques, including remote procedure calls. The teachings of various embodiments are not limited to any particular programming language or environment.

Thus, other embodiments can be realized. For example, an article of manufacture, such as a computer, a memory system, a magnetic or optical disk, some other storage device, and/or any type of electronic device or system can include one or more processors 2002 coupled to a machine-readable medium 2022 such as a memory (e.g., removable storage media, as well as any memory including an electrical, optical, or electromagnetic conductor) having instructions 2024 stored thereon (e.g., computer program instructions), which when executed by the one or more processors 2002 result in performing any of the actions described with respect to the methods above.

The machine 2000 can take the form of a computer system having a processor 2002 coupled to a number of components directly, and/or using a bus 2008. Such components can include main memory 2004, static or non-volatile memory 2006, and mass storage 2016. Other components coupled to the processor 2002 can include an output device 2010, such as a video display, an input device 2012, such as a keyboard, and a cursor control device 2014, such as a mouse. A network interface device 2020 to couple the processor 2002 and other components to a network 2026 can also be coupled to the bus 2008. The instructions 2024 can further be transmitted or received over the network 2026 via the network interface device 2020 utilizing any one of a number of well-known transfer protocols (e.g., HTTP). Any of these elements coupled to the bus 2008 can be absent, present singly, or present in plural numbers, depending on the specific embodiment to be realized.

The processor 2002, the memories 2004, 2006, and the storage device 2016 can each include instructions 2024 which, when executed, cause the machine 2000 to perform any one or more of the methods described herein. In alternative embodiments, the machine 2000 operates as a standalone device or can be connected (e.g., networked) to other machines. In a networked environment, the machine 2000 can operate in the capacity of a server or a client machine in server-client network environment, or as a peer machine in a peer-to-peer (or distributed) network environment. The machine 2000 can be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine 2000 is illustrated, the term "machine" shall also be taken to include any collection of machines that individually or jointly execute a set (or multiple sets) of instructions to perform any one or more of the methodologies discussed herein.

While the machine-readable medium 2024 is shown as a single medium, the term "machine-readable medium" should be taken to include a single medium or multiple media (e.g., a centralized or distributed database, and/or associated caches and servers, and or a variety of storage media, such as the processor 2002 registers, memories 2004, 2006, and the storage device 2016) that store the one or more sets of instructions 2024. The term "machine-readable medium" shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to tangible media, such as solid-state memories, optical, and magnetic media.

Example Embodiments

Example 1 includes a first configuration item having a first property. The first property is in a first class of a plurality of classes, different classes of the plurality of classes correspond to properties that have a different relationship with a corresponding configuration item. The first property of the configuration item is compared to a plurality of properties from configuration items in a configuration management database. The first configuration item is combined with a second configuration item when a property of the second configuration item matches the first property and the first class indicates that a match between properties corresponds to a match between configuration items. A new configuration item is created for the first configuration item when the first property does not match any of the plurality of properties and the first class indicates that a non-match with all of the plurality of properties corresponds to a new configuration item.

In Example 2 the plurality of classes of Example 1 can optionally include unique identifiers having a one-to-one relationship with a configuration item, general identifiers having a many-to-one relationship with a configuration item, and differentiators having a one-to-many relationship with a configuration item.

In Example 3, the subject matter of any one of Examples 1-2 can optionally include using the at least one computer to compare the first unique identifier to other unique identifiers from configuration items in the configuration management database when the configuration item includes a first unique identifier, compare the first general identifier to other general identifiers from configuration items in the configuration management database when the configuration item includes a first general identifier, and compare the first differentiator to other differentiators from configuration items in the configuration management database when the configuration item includes a first differentiator.

In Example 4, the subject matter of any one of Examples 1-3 can optionally include using the at least one computer to determine a match between the first configuration item and a second configuration item when the first unique identifier matches a second unique identifier associated with the second configuration item, and determine that the first configuration item is a new configuration item when the first unique identifier does not match any other unique identifiers.

In Example 5, the subject matter of any one of Examples 1-4 can optionally include using the at least one computer to determine a match between the first configuration item and a second configuration item when the first general identifier matches a second general identifier associated with the second configuration item.

In Example 6, the subject matter of any one Examples 1-5 can optionally include using the at least one computer to determine that the first configuration item is a new configuration item when the first differentiator does not match any other differentiators.

In Example 7, the subject matter of any one of Examples 1-6 can optionally include using the at least one computer to determine that the first configuration item cannot be matched with any other configuration items and cannot be determined to be a new configuration item when the first configuration item does not include any unique identifiers, any general identifiers of the first configuration do not match any other general identifiers from configuration items in the configuration management database, and any differentiators of the first configuration item match at least one other differentiator associated with configuration items from configuration items in the configuration management database.

Example 8 includes a memory having software stored thereon; and a programmable processor communicatively coupled to the memory, wherein the software, when executed by the programmable processor, causes the programmable processor to perform certain acts. The acts include comparing a first property for a first configuration item to a plurality of properties from configuration items in a configuration management database, wherein the first property is classified in a first class of a plurality of classes, wherein different classes of the plurality of classes correspond to properties that have a different relationship with a corresponding configuration item. The acts also include combining the first configuration item with a second configuration item when a property of the second configuration item matches the first property and the first class indicates that a match between properties corresponds to a match between configuration items. The acts also include creating a new configuration item for the first configuration item when the first property does not match any of the plurality of properties and the first class indicates that a non-match with all of the plurality of properties corresponds to a new configuration item.

In Example 9, the plurality of classes of Example 8 can optionally include unique identifiers having a one-to-one relationship with a configuration item, general identifiers having a many-to-one relationship with a configuration item, and differentiators having a one-to-many relationship with a configuration item.

In Example 10, the software of any one of Examples 8-9 can optionally cause the programmable processor to compare the first unique identifier to other unique identifiers from configuration items in the configuration management database when the configuration item includes a first unique identifier, compare the first general identifier to other general identifiers from configuration items in the configuration management database when the configuration item includes a first general identifier, and compare the first differentiator to other differentiators from configuration items in the configuration management database when the configuration item includes a first differentiator.

In Example 11, the software of any one of Examples 8-10 can optionally cause the programmable processor to determine a match between the first configuration item and a second configuration item when the first unique identifier matches a second unique identifier associated with the second configuration item, and determine that the first configuration item is a new configuration item when the first unique identifier does not match any other unique identifiers.

In Example 12, the software of any one of Examples 8-11 can optionally cause the programmable processor to determine a match between the first configuration item and a second configuration item when the first general identifier matches a second general identifier associated with the second configuration item.

In Example 13, the software of any one of Examples 8-12 can optionally cause the programmable processor to determine that the first configuration item is a new configuration item when the first differentiator does not match any other differentiators.

In Example 14, the software of any one of Examples 8-13 can optionally cause the programmable processor to determine that the first configuration item cannot be matched with any other configuration items and cannot be determined to be a new configuration item when the first configuration item does not include any unique identifiers, any general identifiers of the first configuration do not match any other general identifiers from configuration items in the configuration management database, and any differentiators of the first configuration item match at least one other differentiator associated with configuration items from configuration items in the configuration management database.

Example 15 includes a machine-readable medium including instructions, which when executed by a machine, cause the machine to perform operations. The operations include comparing a first property for a first configuration item to a plurality of properties from configuration items in a configuration management database, wherein the first property is classified in a first class of a plurality of classes, wherein different classes of the plurality of classes correspond to properties that have a different relationship with a corresponding configuration item. The operations also include combining the first configuration item with a second configuration item when a property of the second configuration item matches the first property and the first class indicates that a match between properties corresponds to a match between configuration items. The operations also include creating a new configuration item for the first configuration item when the first property does not match any of the plurality of properties and the first class indicates that a non-match with all of the plurality of properties corresponds to a new configuration item.

In Example 16, the plurality of classes of Example 15 can optionally include unique identifiers having a one-to-one relationship with a configuration item, general identifiers having a many-to-one relationship with a configuration item, and differentiators having a one-to-many relationship with a configuration item.

In Example 17, the instructions of any one of Examples 15-16 can optionally cause the machine to perform operations comprising comparing the first unique identifier to other unique identifiers from configuration items in the configuration management database when the configuration item includes a first unique identifier, comparing the first general identifier to other general identifiers from configuration items in the configuration management database when the configuration item includes a first general identifier, and comparing the first differentiator to other differentiators from configuration items in the configuration management database when the configuration item includes a first differentiator.

In Example 18, the instructions of any one of Examples 15-17 can optionally cause the machine to perform operations comprising determining a match between the first configuration item and a second configuration item when the first unique identifier matches a second unique identifier associated with the second configuration item, and determining that the first configuration item is a new configuration item when the first unique identifier does not match any other unique identifiers.

In Example 19, the instructions of any one of Examples 15-18 can optionally cause the machine to perform operations comprising determining a match between the first configuration item and a second configuration item when the first general identifier matches a second general identifier associated with the second configuration item, and determining that the first configuration item is a new configuration item when the first differentiator does not match any other differentiators.

In Example 20, the instructions of any one of Examples 15-19 can optionally cause the machine to perform operations comprising determining that the first configuration item cannot be matched with any other configuration items and cannot be determined to be a new configuration item when the first configuration item does not include any unique identifiers, any general identifiers of the first configuration do not match any other general identifiers from configuration items in the configuration management database, and any differentiators of the first configuration item match at least one other differentiator associated with configuration items from configuration items in the configuration management database.

Additional Notes

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

What is claimed is:

1. A method for reconciling configuration item information, the method comprising:
    selecting a first identifier from a first plurality of identifiers associated with a first configuration item, wherein the first identifier is of a first class of identifiers that has a many identifiers-to-one configuration item relationship with configuration items, wherein the first identifier is of a first type of a plurality of types of identifiers;
    comparing the first identifier to a second plurality of identifiers in a database, wherein each of the second plurality of identifiers is of the first class of identifiers and is of the first type of the plurality of types of identifiers;
    in response to a determination that the first identifier matches a first of the second plurality of identifiers that is associated with a second configuration item,
        reconciling information for the first configuration item with information for the second configuration item in the database; and
    in response to a determination that the first identifier does not match one of the second plurality of identifiers,
        selecting a second identifier from the first plurality of identifiers associated with the first configuration item;
        comparing the second identifier to a third plurality of identifiers in the database; and
        determining whether the first configuration item matches a configuration item in the database based, at least in part, on said comparing of the second identifier to the third plurality of identifiers in the database.

2. The method of claim 1, further comprising:
    selecting a third identifier associated with a third configuration item, wherein the third identifier is of a second class of identifiers that has a one-to-one relationship with configuration items; and
    comparing the third identifier to a fourth plurality of identifiers of the second class of identifiers in the database.

3. The method of claim 2; further comprising:
    in response to a determination that the third identifier matches a first of the fourth plurality of identifiers that is associated with a fourth configuration item,
        reconciling the information for the third configuration item with information for the fourth configuration item in the database.

4. The method of claim 2, further comprising:
    in response to a determination that the third identifier does not match any of the fourth plurality of identifiers,
        adding the information for the third configuration item to the database.

5. The method of claim 1, wherein said selecting the first identifier associated with the first configuration item is in response to a determination that the first configuration item is not associated with an identifier of a second class of identifiers that has a one-to-one relationship with configuration items.

6. The method of claim 1, wherein the second identifier is of a second class of identifiers that has a one identifier-to-many configuration items relationship with configuration items, wherein each of the third plurality of identifiers is of the second class of identifiers, further comprising:
    in response to a determination that the second identifier does not match any of the third plurality of identifiers,
        adding the information for the first configuration item to the database.

7. The method of claim 1, wherein the third plurality of identifiers includes at least one identifier in the second plurality of identifiers.

8. A system comprising:
    a processor;
    a machine-readable medium having program code executable by the processor to cause the system to:
        select a first identifier from a first plurality of identifiers associated with a first configuration item, wherein the first identifier is of a first class of identifiers that has a many identifiers-to-one configuration item relationship with configuration items, wherein the first identifier is of a first type of a plurality of types of identifiers;
        compare the first identifier to a second plurality of identifiers in a database, wherein each of the second plurality of identifiers is of the first class of identifiers and is of the first type of the plurality of types of identifiers;
        in response to a determination that the first identifier matches a first of the second plurality of identifiers that is associated with a second configuration item,
            reconcile information for the first configuration item with information for the second configuration item in the database; and
        in response to a determination that the first identifier does not match at least one of the second plurality of identifiers,
            select a second identifier from the first plurality of identifiers associated with the first configuration item;
            compare the second identifier to a third plurality of identifiers in the database; and
            determine whether the first configuration item matches a configuration item in the database based, at least in part, on the comparison of the second identifier to the third plurality of identifiers in the database.

9. The system of claim 8 further comprising program code executable by the processor to cause the system to:
select a third identifier associated with a third configuration item, wherein the third identifier is of a second class of identifiers that has a one-to-one relationship with configuration items; and
compare the third identifier to a fourth plurality of identifiers of the second class of identifiers in the database.

10. The system of claim 9 further comprising program code executable by, the processor to cause the system to:
in response to a determination that the third identifier matches a first of the fourth plurality of identifiers that is associated with a fourth configuration item,
reconcile the information for the third configuration item with information for the fourth configuration item in the database.

11. The system of claim 9 further comprising program code executable by, the processor to cause the system to:
in response to a determination that the third identifier does not match any of the fourth plurality of identifiers,
add the information for the third configuration item to the database.

12. The system of claim 8, wherein the program code executable by the processor to cause the system to select the first identifier associated with the first configuration item comprises program code executable by the processor to cause the system to select the first identifier associated with the first configuration item in response to a determination that the first configuration item is not associated with an identifier of a second class of identifiers that has a one-to-one relationship with configuration items.

13. The system of claim 8, wherein the second identifier is of a second class of identifiers that has a one identifier-to-many configuration items relationship with configuration items, wherein each of the third plurality of identifiers is of the second class of identifiers, further comprising program code executable by the processor to cause the system to:
in response to a determination that the second identifier does not match any of the third plurality of identifiers,
add the information for the first configuration item to the database.

14. The system of claim 8, wherein the third plurality of identifiers includes at least one identifier in the second plurality of identifiers.

15. A computer program product comprising:
a non-transitory computer readable storage medium having computer readable program code embodied therewith, the computer readable program code comprising instructions to:
select a first identifier from a first plurality of identifiers associated with a first configuration item, wherein the first identifier is of a first class of identifiers that has a many identifiers-to-one configuration item relationship with configuration items, wherein the first identifier is of a first type of a plurality of types of identifiers;
compare the first identifier to a second plurality of identifiers in a database, wherein each of the second plurality of identifiers is of the first class of identifiers and is of the first type of the plurality of types of identifiers;
in response to a determination that the first identifier matches a first of the second plurality of identifiers that is associated with a second configuration item,
reconcile information for the first configuration item with information for the second configuration item in the database; and
in response to a determination that the first identifier does not match at least one of the second plurality of identifiers,
select a second identifier from the first plurality of identifiers associated with the first configuration item;
compare the second identifier to a third plurality of identifiers in the database; and
determine whether the first configuration item matches a configuration item in the database based, at least in part, on the comparison of the second identifier to the third plurality of identifiers in the database.

16. The computer program product of claim 15 further comprising instructions to:
select a third identifier associated with a third configuration item, wherein the third identifier is of a second class of identifiers that has a one-to-one relationship with configuration items; and
compare the third identifier to a fourth plurality of identifiers of the second class of identifiers in the database.

17. The computer program product of claim 16 further comprising instructions to:
in response to a determination that the third identifier matches a first of the fourth plurality of identifiers that is associated with a fourth configuration item,
reconcile the information for the third configuration item with information for the fourth configuration item in the database.

18. The computer program product of claim 16 further comprising instructions to:
in response to a determination that the third identifier does not match any of the fourth plurality of identifiers,
add the information for the third configuration item to the database.

19. The computer program product of claim 15, wherein the second identifier is of a second class of identifiers that has a one identifier-to-many configuration items relationship with configuration items, wherein each of the third plurality of identifiers is of the second class of identifiers, further comprising instructions to:
in response to a determination that the second identifier does not match any of the third plurality of identifiers,
add the information for the first configuration item to the database.

20. The computer program product of claim 15, wherein the third plurality of identifiers includes at least one identifier in the second plurality of identifiers.

* * * * *